United States Patent

[11] 3,574,365

[72] Inventors James K. Bailey
Commack;
Warren H. Enners, Farmingdale, N.Y.
[21] Appl. No. 814,106
[22] Filed Apr. 7, 1969
[45] Patented Apr. 13, 1971
[73] Assignee Potter Instrument Company, Inc.
Plainview, N.Y.

[54] LOCK FOR DETACHABLY MOUNTING A TAPE REEL HUB TO A DRIVE SHAFT
1 Claim, 3 Drawing Figs.

[52] U.S. Cl. .......... 287/53, 242/68.3
[51] Int. Cl. .......... F16d 1/06
[50] Field of Search .......... 287/53, 52.05, 53 (LK), 52.06, 52.09; 242/68.3, 72

[56] References Cited

UNITED STATES PATENTS

| | | | |
|---|---|---|---|
| 603,692 | 5/1898 | Hoyt et al. .......... | 287/53L.K. |
| 2,481,000 | 9/1949 | Brunner .......... | 242/72 |
| 2,757,877 | 8/1956 | Sinnett .......... | 242/68.3 |
| 2,770,004 | 11/1956 | Carlson .......... | 287/53X |

FOREIGN PATENTS

| | | | |
|---|---|---|---|
| 3,742 | 1885 | Great Britain .......... | 287/52.09 |
| 1,186,693 | 2/1959 | France .......... | 287/53 |

*Primary Examiner*—Thomas F. Callaghan
*Assistant Examiner*—Andrew V. Kundrat
*Attorney*—Laurence J. Marhoefer

ABSTRACT: The specification and drawings disclose a lock for detachably mounting a tape reel hub to a drive shaft in which a conical plug is drawn into a conical slot in the hub forcing the plug upwardly so that a flat surface on the plug tightly engages a corresponding flat surface on the motor drive shaft.

PATENTED APR 1 3 1971 3,574,365

INVENTORS
JAMES K. BAILEY
WARREN H. ENNERS
BY Laurence J. Marhoefer
ATTORNEY

LOCK FOR DETACHABLY MOUNTING A TAPE REEL HUB TO A DRIVE SHAFT

BACKGROUND OF THE INVENTION

The present invention, generally, relates to reel hub locks and, more particularly, to a new and improved reel hub lock for securing a reel of data processing tape on a tape transport.

Information for use by computers, or central data processors of computers is stored on reels of magnetic or perforated tape. To process this information the reel is rotated by tape transport apparatus; not uncommonly the start/stop requirements for the tape are on the order of a few milliseconds.

The reels of data processing tape frequently weigh several pounds, and the rotational moment of inertia, therefore, is quite large. Repeated starting and stopping over a period of time causes the reel hubs to work loose on the motor shafts with prior-art devices such as setscrews and keys for securing hubs to the motor shaft.

Accordingly, a principal object of the present invention is to provide a new and improved lock which will securely affix a hub to a rotatable drive shaft and prevent both relative rotation and relative axial motion between the hub and the shaft.

Another object of the invention is the provision of a lock for reel hubs which does not require that a keyway be cut in the motor shaft.

SUMMARY OF THE INVENTION

Briefly, a reel hub lock constructed in accordance with the principles of the present invention includes a conical plug which has a flat surface for engaging a flat surface on the motor drive shaft. The hub has a bore through which the motor shaft passes. A conical slot in the hub on one side of the bore receives the plug. A threaded bolt passing through a longitudinal bore in the plug, screws into the rear wall of the hub, drawing the plug into the slot and forcing it upwardly into engagement with the flat on the motor shaft.

Reel hubs of the type with which the present invention is applicable may be, by way of example, of the type shown in Ser. No. 788,430, filed Jan. 2, 1969, and assigned to the same assignee as the present invention. Such reel hubs in the past have been attached to a drive shaft by a key with a suitable setscrew.

BRIEF DESCRIPTION OF THE DRAWINGS

These and other objects and advantages of the present invention will become more readily apparent from the following detailed description of a presently preferred form of the invention taken in conjunction with the accompanying drawings.

In the drawings.

DESCRIPTION OF THE PREFERRED EMBODIMENT

Figures 1, 2, 3:
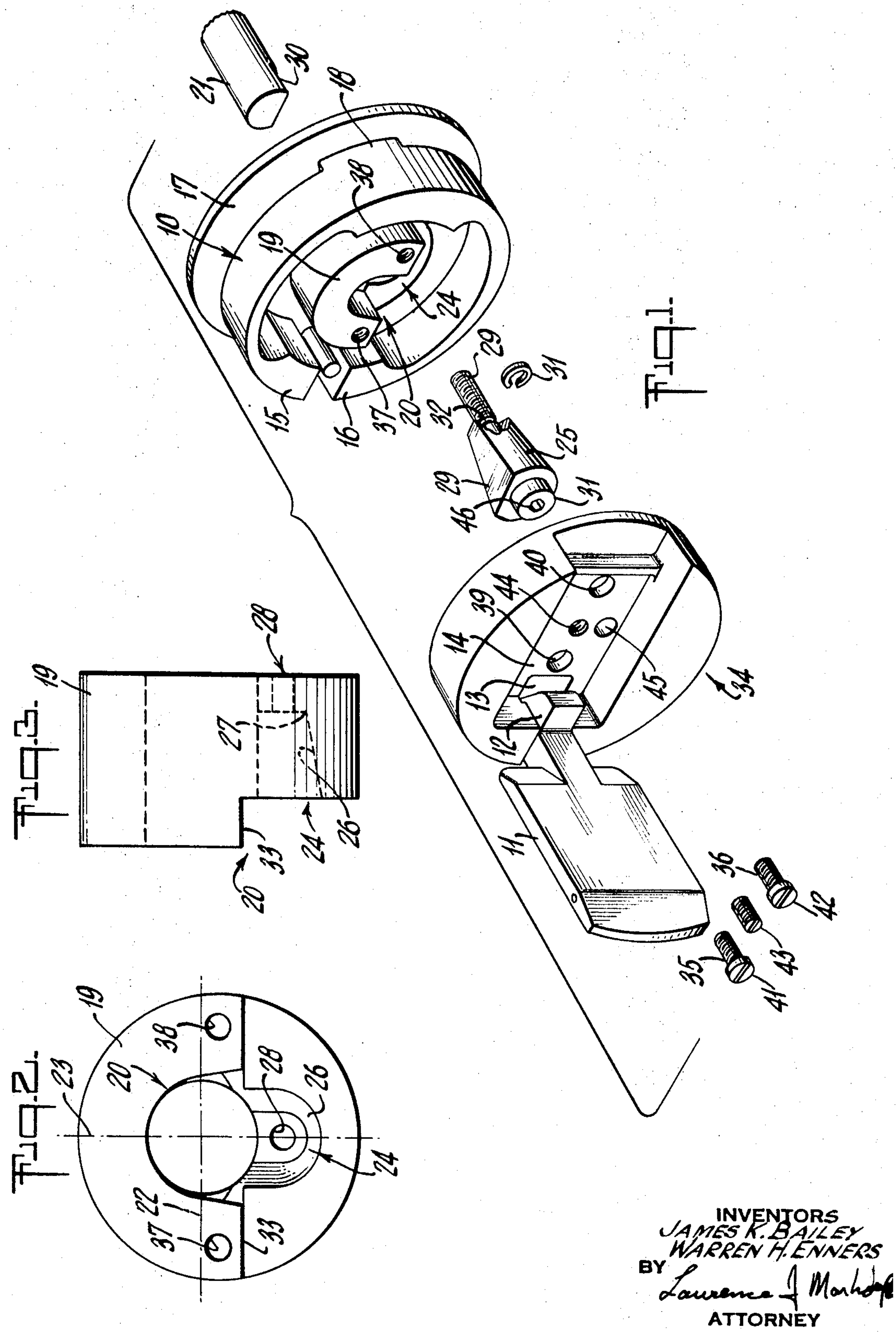
FIG. 1 is an exploded view in perspective showing the interrelationship of the various component parts.
FIG. 2 is a view taken along the line A–A in FIG. 1.
FIG. 3 is a side view of the partial section shown in FIG. 2.

Referring now to the present invention and more specifically to FIG. 1 of the drawings, the numeral 10 identifies generally an expansible friction surface for engaging the central bore of a tape reel. The mechanism for actuating the expansible friction surface is a tapered actuating cam 12 controlled by pivoting a hinged front lever 11, shown in its open or releasing position. When the lever 11 is pivoted to the right in the drawing, the cam 12 passes through an opening 13 in a recessed wall 14 to spread ends 15 and 16 of the expansible friction surface 10.

A circumferential flange 17 provides a surface which a tape reel engages to properly locate the reel with respect to the hub. It should be noted that the tape reel must be located precisely with respect to guides (not shown) on the tape transport. Thus, it is imperative that the hub does not move axially along the motor shaft even after reels have been repeatedly placed on and removed from the hub.

Centered within the expansible friction surface 10 and preferably integral with the flange 17 is an inner hub or base 19. The hub 19 has an opening 20 to receive a drive shaft 21, the centerlines of which, indicated by the numerals 22 and 23 in FIG. 2, coincide with the centerlines of the drive shaft 21 and the centerlines of the expansible friction surface 10.

A slot or channel 24 formed in the hub 19 is contiguous with the opening 20 and has inwardly converging walls to receive a frustoconical plug 25. In FIG. 3, the numeral 26 illustrates the walls of the channel 24. There is a threaded aperture 28 at the end 27 of the channel 24, which receives a screw 29 for drawing the plug 25 into the channel 24.

One side of the frustoconical plug 25 is formed with a flat surface 29 for engaging a flat surface 30 on the drive shaft 21. A longitudinal bore (not visible) through the plug 25 is sufficiently large in diameter to receive the screw 29 freely. The screw 29 has a head 31 sufficiently large to permit it to draw the plug 25 into the channel 24 when it is screwed into the aperture 28. As the plug is drawn into the channel, it moves upwardly. Owing to the mechanical advantage produced by the inclined surface of the plug and channel, an extremely tight frictional engagement between the flat surfaces of the plug and motor shaft results. This engagement is so tight that it has proven satisfactory in preventing relative axial movement of the hub and shaft as well as relative rotational movement.

A retaining ring 31 snapped into a groove 32 on the screw 29 prevents the screw from falling out of the plug.

A cover 34 is attached to the base 19 by the two screws 35 and 36 that engage threaded holes 37 and 38, respectively. Each of the screws 35 and 36 pass freely through holes 39 and 40 which are countersunk in the recessed surface 14. When they are tightened, the enlarged heads 41 and 42 secure the cover disc 34 firmly in place against the hub 19.

A setscrew 43 is threaded through an axially positioned hole 44 in the cover 34 and extends beyond the side of the disc. This screw 43 abuts the end of the shaft 21 and thusly determines the position of the hub axially on the shaft.

With the cover 34 in position, it need not be disturbed to remove the reel hub. An opening 45 permits access to the end 31 of the screw 29 with an instrument, such as an allen wrench, to cooperate with an appropriate recess 46 for manipulating the screw 29.

In operation, it will be understood that the parts shown exploded in FIG. 1 are assembled. The hub is slipped onto the shaft 21 with the plug 25 resting in the channel. The position of the hub axially is determined when the screw 43 abuts the end of the shaft 21. The screw 29 is then tightened through opening 45, securing the hub to the shaft.

To mount a tape reel, the lever 11 is pivoted into the position shown in FIG. 1, and a reel is slipped over the friction surface 10. By pivoting the lever 11 back into the recessed surface 14, the cam 12 separates the ends 15 and 16 so that the expansible friction surface 10 locks the tape reel in place.

The tape reel is removed by reversing the above steps, and another reel is mounted in its place, quickly, easily and effectively.

Other modifications may be made to the above-described specific embodiment of the invention without departing from the spirit and scope of the invention, which is defined in the appended claims.

We claim:

1. A lock for detachably mounting a tape reel hub to a drive shaft, comprising in combination:
   an expansible ring having a friction surface for engaging the central bore of a reel;
   an inner hub centrally disposed with respect to the expansible band;
   said inner hub including means defining an opening to receive a drive shaft and a contiguous slot having walls converging inwardly toward the shaft opening;

a conical plug;

a rod passing through a bore in said plug, said rod threadedly engaging an aperture in the wall of said reel hub; and a cover attached to said hub, said cover including an opening aligned with said rod whereby said rod may be screwed into said hub through said opening.